United States Patent
Wong et al.

(10) Patent No.: US 10,560,903 B2
(45) Date of Patent: Feb. 11, 2020

(54) COMMUNICATIONS DEVICE, INFRASTRUCTURE EQUIPMENT, COMMUNICATIONS SYSTEM AND METHODS

(71) Applicant: Sony Corporation, Tokyo (JP)

(72) Inventors: Shin Horng Wong, Basingstoke (GB); Martin Warwick Beale, Basingstoke (GB); Brian Alexander Martin, Basingstoke (GB); Shinichiro Tsuda, Basingstoke (GB)

(73) Assignee: SONY CORPORATION, Tokyo (JP)

(*) Notice: Subject to any disclaimer, the term of this patent is extended or adjusted under 35 U.S.C. 154(b) by 11 days.

(21) Appl. No.: 15/770,843

(22) PCT Filed: Oct. 13, 2016

(86) PCT No.: PCT/EP2016/074582
§ 371 (c)(1),
(2) Date: Apr. 25, 2018

(87) PCT Pub. No.: WO2017/076599
PCT Pub. Date: May 11, 2017

(65) Prior Publication Data
US 2019/0320395 A1    Oct. 17, 2019

(30) Foreign Application Priority Data
Nov. 6, 2015 (EP) .................... 15193566

(51) Int. Cl.
*H04W 52/28* (2009.01)
*H04L 5/00* (2006.01)
*H04W 74/08* (2009.01)

(52) U.S. Cl.
CPC ......... *H04W 52/281* (2013.01); *H04L 5/0005* (2013.01); *H04W 74/0833* (2013.01)

(58) Field of Classification Search
CPC ............ H04W 52/281; H04W 74/0833; H04L 5/0005
(Continued)

(56) References Cited

U.S. PATENT DOCUMENTS 9,307,502 B1 *  4/2016  Tailor ................. H04W 52/243
9,883,469 B2    1/2018  Webb et al.
(Continued)

OTHER PUBLICATIONS

Harri Holma, et al., "LTE for UMTS OFDMA and SC-FDMA Based Radio Access," John Wiley & Sons, Ltd., 2009, ISBN 978-0-470-99401-6, 8 pages.
(Continued)

*Primary Examiner* — Phong La
(74) *Attorney, Agent, or Firm* — Xsensus LLP

(57) ABSTRACT

An infrastructure equipment transmitting/receiving data to/from one or more communications devices in a wireless communications network, includes a transmitter, receiver, and controller controlling the transmitter and receiver to provide a wireless access interface providing communications resources arranged in time divided units of a system bandwidth providing plural blocks of communications resources, and one or more narrowband carriers. Each carrier provides, within a carrier frequency bandwidth, communications resources for allocation to narrow band communications devices, the carrier bandwidth being less than and within the system bandwidth, signals being transmitted to the narrowband communications devices via the narrow band carriers with a first power. The controller controls the transmitter to transmit signals on a down-link of a narrow-band carrier to a narrow-band communications device with an increased power, power of the signals being increased to a greater second power to reduce a time of communicating a high priority message.

18 Claims, 7 Drawing Sheets

(58) Field of Classification Search
USPC ........................................................ 370/329
See application file for complete search history.

(56) References Cited

U.S. PATENT DOCUMENTS

| | | | |
|---|---|---|---|
| 2007/0121722 A1 | 5/2007 | Martinian et al. | |
| 2010/0188254 A1* | 7/2010 | Johnson | H04W 36/30 340/870.02 |
| 2010/0322311 A1 | 12/2010 | Vetro et al. | |
| 2011/0194452 A1 | 8/2011 | Orlik et al. | |
| 2013/0188537 A1* | 7/2013 | Marque-Pucheu | H04W 72/0453 370/281 |
| 2013/0301524 A1 | 11/2013 | Xu et al. | |
| 2013/0301525 A1 | 11/2013 | Xu et al. | |
| 2013/0301552 A1 | 11/2013 | Xu et al. | |
| 2014/0198772 A1 | 7/2014 | Baldemair et al. | |
| 2014/0269545 A1* | 9/2014 | Galeev | H04L 5/0026 370/329 |
| 2014/0362781 A1* | 12/2014 | Yun | H04L 5/0023 370/329 |
| 2015/0373715 A1* | 12/2015 | Kliger | H04W 52/18 370/329 |
| 2016/0127097 A1* | 5/2016 | Chen | H04L 5/0051 370/330 |
| 2016/0285578 A1 | 9/2016 | Webb et al. | |
| 2016/0353476 A1* | 12/2016 | Sartori | H04L 5/0005 |
| 2016/0360478 A1* | 12/2016 | Malladi | H04W 72/042 |

OTHER PUBLICATIONS

Qualcomm Incorporated, RP-151621, "New Work Item: NarrowBand IOT (NB-IOT)," 3GPP TSG RAN Meeting #69, Sep. 14-16, 2015, 9 pages.

"3$^{rd}$ Generation Partnership Project; Technical Specification Group GSM/EDGE Radio Access Network; Cellular System Support for Ultra Low Complexity and Low Throughput Internet of Things; (Release 13), Technical Report," 3GPP TR 45.820 V2.1.0, Aug. 2015, 524 pages.

International Search Report dated Nov. 30, 2016 in PCT/EP2016/074582 filed Oct. 13, 2016.

* cited by examiner

COMMUNICATIONS DEVICE, INFRASTRUCTURE EQUIPMENT, COMMUNICATIONS SYSTEM AND METHODS

TECHNICAL FIELD OF THE DISCLOSURE

The present disclosure relates to communications devices configured to transmit data to and receive data from an infrastructure equipment forming part of a wireless communications network. In some embodiments the wireless access interface is configured to provide one or more narrowband carriers within a system carrier frequency bandwidth of the wireless communications network. The present invention also relates to methods of communicating using communications devices, wireless communications network, infrastructure equipment and methods.

BACKGROUND OF THE DISCLOSURE

Third and fourth generation mobile telecommunication systems, such as those based on the 3GPP defined UMTS and Long Term Evolution (LTE) architecture are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly. However, whilst fourth generation networks can support communications at high data rate and low latencies from devices such as smart phones and tablet computers, it is expected that future wireless communications networks will need to support communications to and from a much wider range of devices, including reduced complexity devices, machine type communication devices, devices which require little or no mobility, high resolution video displays and virtual reality headsets. For the example of low cost-communications devices it is desirable to employ techniques which can extend radio coverage using repeated transmission in which messages are transmitted more than once to increase a likelihood of receiving the message. However such techniques may have an effect of delaying communication, which may be important for high priority messages.

SUMMARY OF THE DISCLOSURE

According to the present technique there is provided an infrastructure equipment for transmitting data to or receiving data from one or more communications devices in a wireless communications network.

The infrastructure equipment comprises a transmitter, a receive and a controller for controlling the transmitter and the receiver to provide a wireless access interface. The wireless access interface provides communications resources arranged in time divided units of a system bandwidth providing a plurality of blocks of communications resources, and one or more narrowband carriers. Each of the narrowband carrier providing within a carrier frequency bandwidth communications resources for allocation to narrow band communications devices, the carrier bandwidth being less than and within the system bandwidth, signals being transmitted to the narrowband communications devices via a downlink of the narrowband carriers with a first power. The controller controls the transmitter to transmit signals on the down-link of a narrowband carrier to a narrow-band communications device with an increased power, the power of the signals being increased above the first power to a second power to reduce a time of communicating a high priority message transmitted to or received from the narrowband communications device.

Embodiments of the present technique can provide an arrangement for transmitting high priority messages within a reduced time. Such messages may be alarms or emergency messages. In order to extend coverage by transmitting signals to or receive signals from a low power communications device or a communications device in poor radio communications conditions it is known to transmit signals repeatedly. However repeated transmission of signals to improve a likelihood of reception increases a time for communicating a message represented by the signals. If however a message is a high priority message then the communication time may be preferably shorter or must be shorter to meet a particular requirement. Accordingly embodiments of the present technique provide an arrangement for reducing a time for communicating a high priority message to or from a narrowband communications device by increasing or boosting a power with which signals are transmitted on a downlink of a narrowband subcarrier to the narrowband communications device, thereby obviating or reducing a requirement for repeated transmission and therefore reducing a transmission time.

In one example the high priority message may by transmitted on a dedicated narrowband subcarrier for high priority messages for which the infrastructure equipment transmits signals with the second power.

According to example embodiments of the present technique, an infrastructure may be configured to form a high priority narrowband carrier in response to an indication from a narrowband communications device.

Various further aspects and embodiments of the disclosure are provided in the appended claims, including but not limited to, a communications device, infrastructure equipment, mobile communications system and a method of communicating.

BRIEF DESCRIPTION OF DRAWINGS

Embodiments of the present disclosure will now be described by way of example only with reference to the accompanying drawings in which like parts are provided with corresponding reference numerals and in which.

DESCRIPTION OF EXAMPLE EMBODIMENTS

Conventional LTE Network

Figure 1:
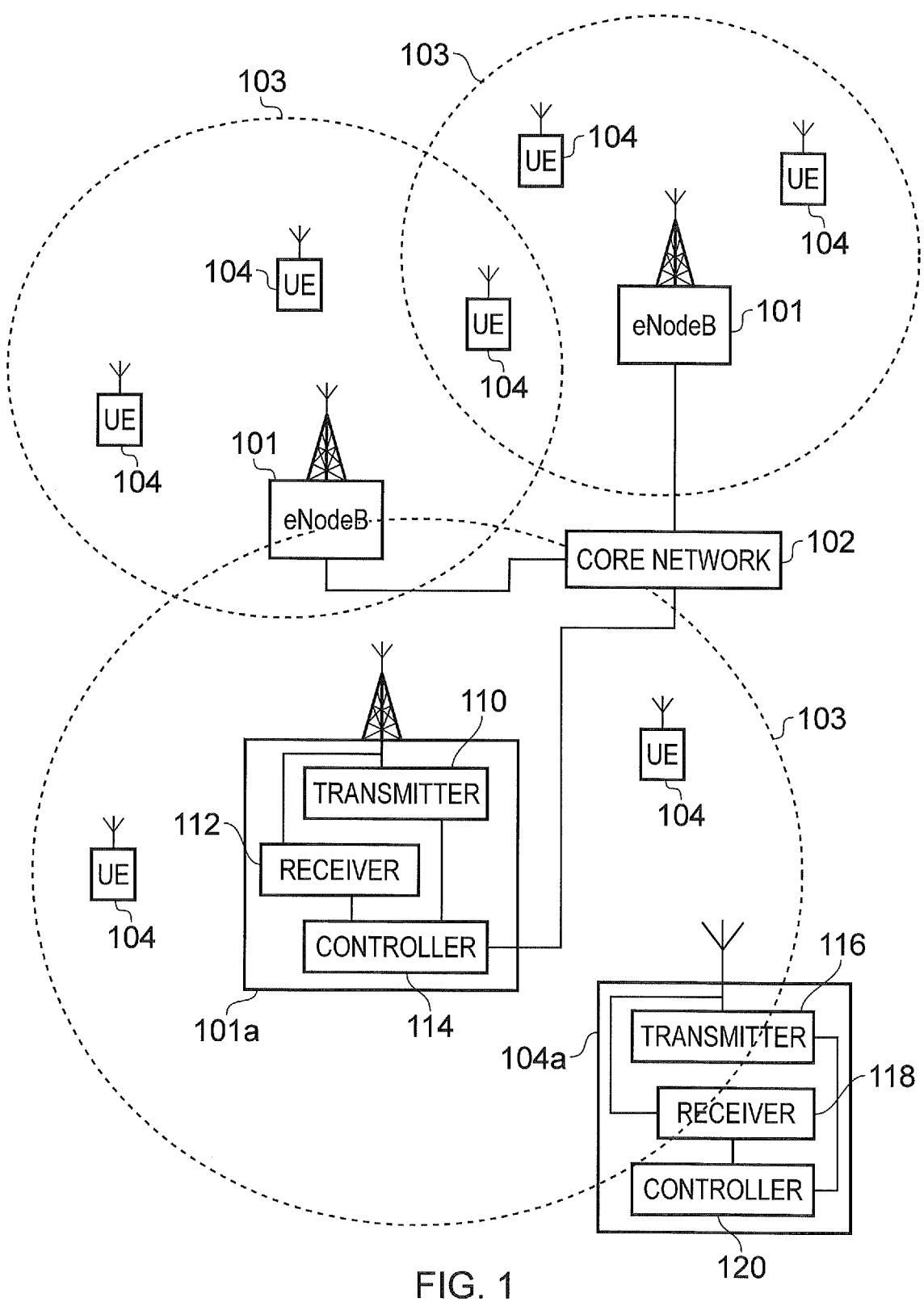
FIG. 1 provides a schematic diagram illustrating an example of a conventional mobile communications system.

FIG. 1 provides a schematic diagram illustrating some basic functionality of a mobile telecommunications network/system operating in accordance with LTE principles. Various elements of FIG. 1 and their respective modes of operation are well-known and defined in the relevant standards administered by the 3GPP (RTM) body, and also described in many books on the subject, for example, Holma H. and Toskala A [1]. It will be appreciated that operational aspects of the telecommunications network which are not specifically described below may be implemented in accordance with any known techniques, for example according to the relevant standards.

The mobile telecommunications system, where the system shown in FIG. 1 includes infrastructure equipment comprising base stations 101 which are connected to a core network 102, which operates in accordance with a conventional arrangement which will be understood by those acquainted with communications technology. The infrastructure equipment 101 may also be referred to as a base station, network element, enhanced NodeB (eNodeB (eNB)) or a coordinating entity for example, and provides a wireless access interface to the one or more communications devices within a coverage area or cell represented by a broken line 103. One or more mobile communications devices 104 may communicate data via the transmission and reception of signals representing data using the wireless access interface. The core network 102 may also provide functionality including authentication, mobility management, charging and so on for the communications devices served by the network entity.

The mobile communications devices of FIG. 1 may also be referred to as communications terminals, user equipment (UE), terminal devices and so forth, and are configured to communicate with one or more other communications devices served by the same or a different coverage area via the network entity. These communications may be performed by transmitting and receiving signals representing data using the wireless access interface over the two way communications links.

As shown in FIG. 1, one of the eNodeBs 101a is shown in more detail to include a transmitter 110 for transmitting signals via a wireless access interface to the one or more communications devices or UEs 104, and a receiver 112 to receive signals from the one or more UEs within the coverage area 103. A controller 114 controls the transmitter 110 and the receiver 112 to transmit and receive the signals via the wireless access interface. The controller 114 may perform a function of controlling the allocation of communications resource elements of the wireless access interface and may in some examples include a scheduler for scheduling transmissions via the wireless access interface for both an uplink and a downlink.

An example UE 104a is shown in more detail to include a transmitter 116 for transmitting signals on the uplink of the wireless access interface to the eNodeB 101 and a receiver 118 for receiving signals transmitted by the eNodeB 101 on the downlink via the wireless access interface. The transmitter 116 and the receiver 118 are controlled by a controller 120.

LTE Wireless Access Interface

Mobile telecommunications systems such as those arranged in accordance with the 3GPP defined Long Term Evolution (LTE) architecture use an orthogonal frequency division modulation (OFDM) based wireless access interface for the radio downlink (so-called OFDMA) and a single carrier frequency division multiple access scheme (SC-FDMA) on the radio uplink. The down-link and the up-link of a wireless access interface according to an LTE standard is presented in FIGS. 2 and 3.

Figure 2:
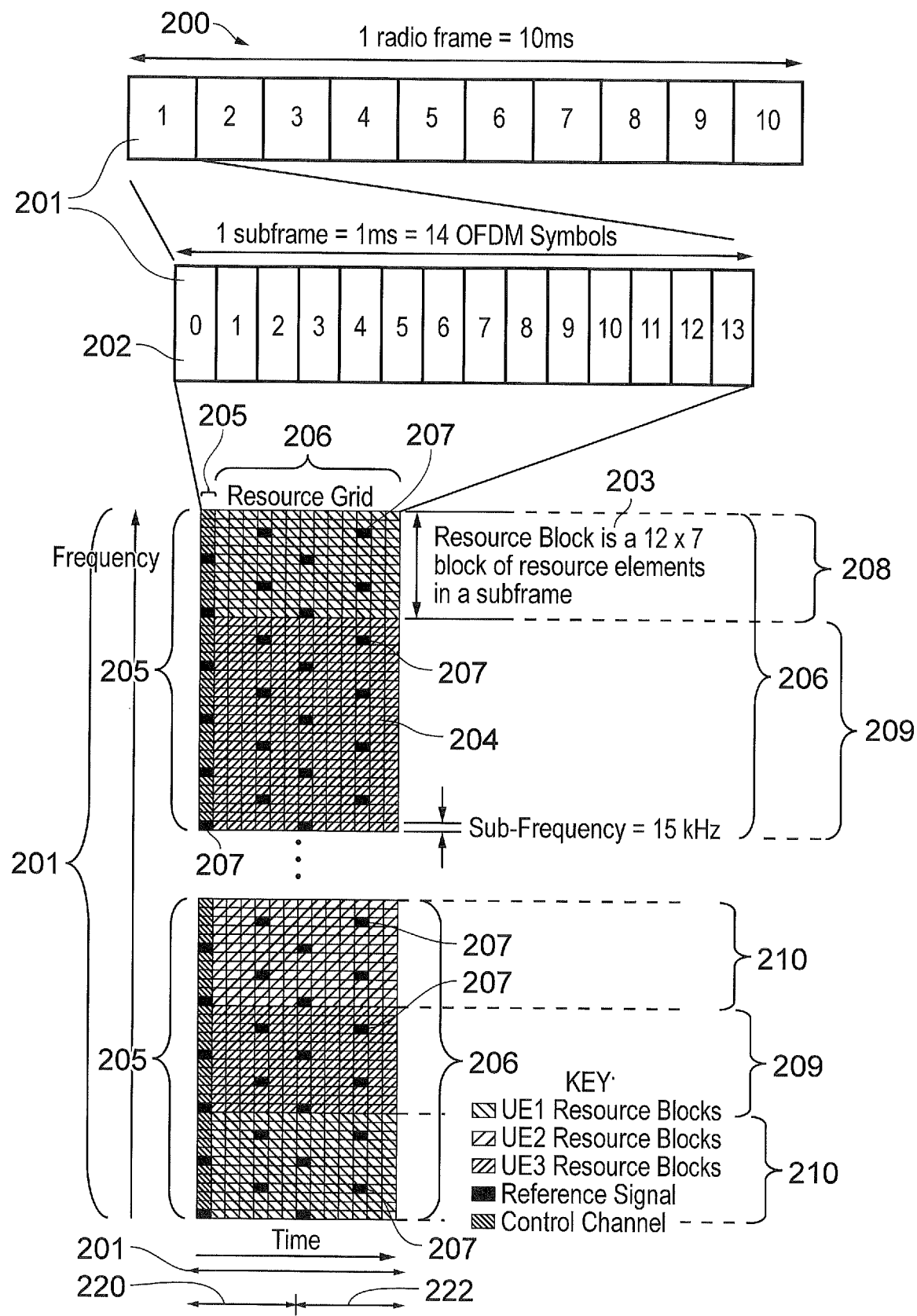
FIG. 2 provides a schematic diagram of a structure of a downlink of a wireless access interface of a mobile communications system operating according to an LTE standard.

FIG. 2 provides a simplified schematic diagram of the structure of a downlink of a wireless access interface that may be provided by or in association with the eNB of FIG. 1 when the communications system is operating in accordance with the LTE standard. In LTE systems the wireless access interface of the downlink from an eNB to a UE is based upon an orthogonal frequency division multiplexing (OFDM) access radio interface. In an OFDM interface the resources of the available bandwidth are divided in frequency into a plurality of orthogonal subcarriers and data is transmitted in parallel on a plurality of orthogonal subcarriers, where bandwidths between 1.4 MHZ and 20 MHz bandwidth may be divided into orthogonal subcarriers. Not all of these subcarriers are used to transmit data (some are used for features such as the cyclic prefix of the OFDM symbols). The number of subcarriers varies between 72 subcarriers (1.4 MHz) and 1200 subcarriers (20 MHz). In some examples the subcarriers are grouped on a basis of $2^n$, for example 128 to 2048, so that both a transmitter and a receiver can use an inverse and a forward Fast Fourier Transform to convert the carriers from the frequency domain to the time domain and from the time domain to the frequency domain respectively. Each subcarrier bandwidth may take any value but in LTE it is fixed at 15 kHz.

As shown in FIG. 2, the resources of the wireless access interface are also temporally divided into frames where a frame 200 lasts 10 ms and is subdivided into 10 sub-frames 201 each within a duration of 1 ms. Each sub-frame 201 is formed from 14 OFDM symbols and is divided into two slots 220, 222 each of which comprise six or seven OFDM symbols depending on whether a normal or extended cyclic prefix is being utilised between OFDM symbols for the reduction of inter symbol interference. The resources within a slot may be divided into resources blocks 203 each comprising 12 subcarriers for the duration of one slot and the resources blocks further divided into resource elements 204 which span one subcarrier for one OFDM symbol, where each rectangle 204 represents a resource element. The resource elements distributed in time within a sub-frame and frequency across the host system band width represent the communications resources of the host system.

The simplified structure of the downlink of an LTE wireless access interface presented in FIG. 2, also includes an illustration of each sub-frame 201, which comprises a control region 205 for the transmission of control data, a data region 206 for the transmission of user data, reference signals 207 and synchronisation signals which are interspersed in the control and data regions in accordance with a predetermined pattern. The control region 204 may contain a number of physical channels for the transmission of control data, such as a physical downlink control channel (PDCCH), a physical control format indicator channel (PCFICH) and a physical HARQ indicator channel (PHICH). The data region may contain a number of physical channels for the transmission of data or control, such as a physical downlink shared channel (PDSCH), enhanced physical downlink control channel (ePDCCH) and a physical broadcast channel (PBCH). Although these physical channels provide a wide range of functionality to LTE systems, in terms of resource allocation and the present disclosure ePDCCH and PDSCH are most relevant. Further information on the structure and functioning of the physical channels of LTE systems can be found in [1].

Figure 3:
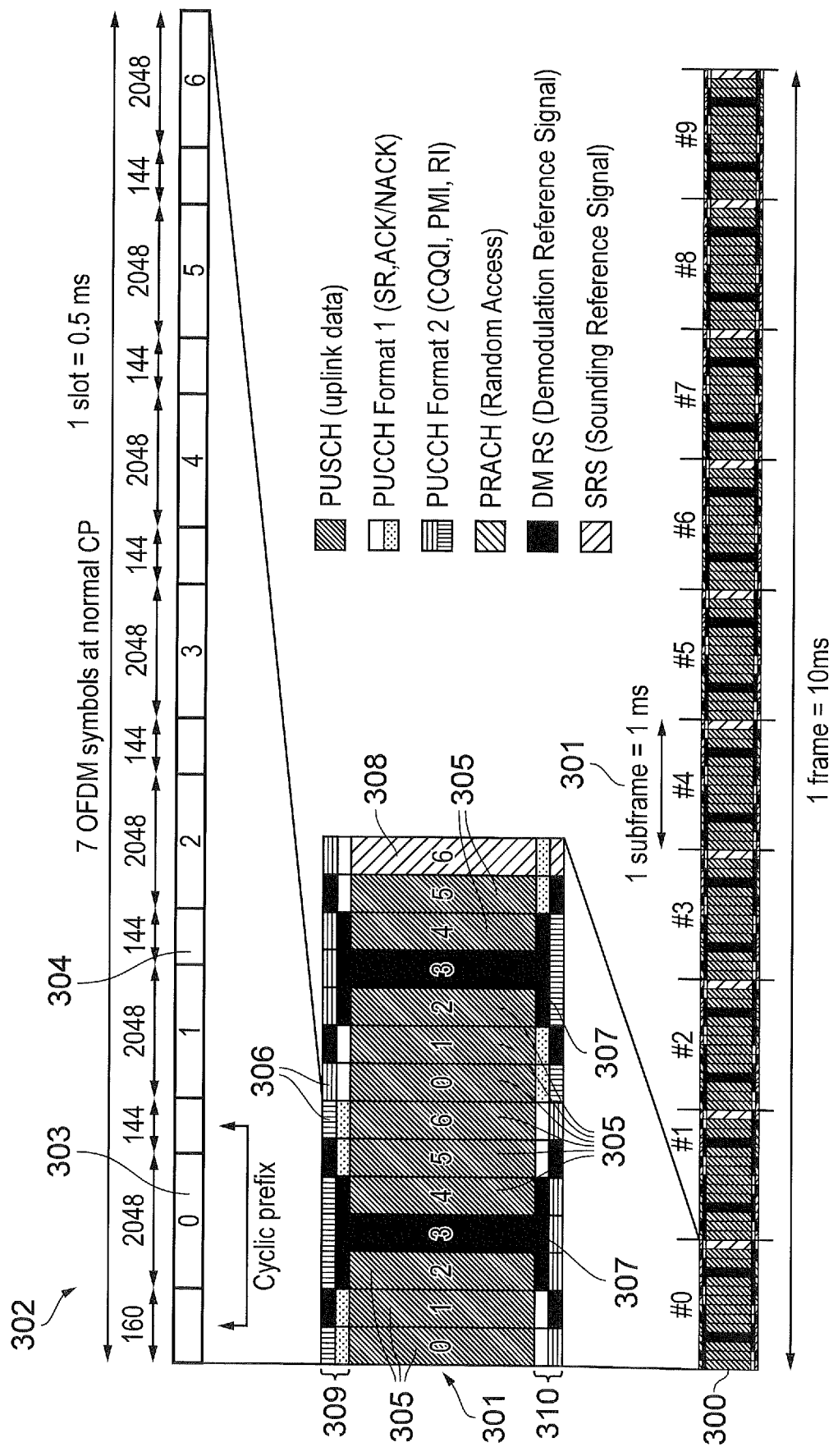
FIG. 3 provides a schematic diagram of an uplink of a wireless access interface of a mobile communications system operating according to an LTE standard.

Resources within the PDSCH may be allocated by an eNB to UEs being served by the eNB. For example, a number of resource blocks of the PDSCH may be allocated to a UE in order that it may receive data that it had previously requested or data which is being pushed to it by the eNB, such as radio resource control (RRC) signalling. In FIG. 3, UE1 has been allocated resources 208 of the data region 206, UE2 resources 209 and UE3 resources 210. UEs in an LTE system may be allocated a fraction of the available resources of the PDSCH and therefore UEs are required to be informed of the location of their allocated resources within the PDCSH so that only relevant data within the PDSCH is detected and estimated. In order to inform the UEs of the location of their allocated communications resource elements, resource control information specifying downlink resource allocations is conveyed across the PDCCH in a form termed downlink control information (DCI), where resource allocations for a PDSCH are communicated in a preceding PDCCH instance in the same sub-frame.

Figure 4:
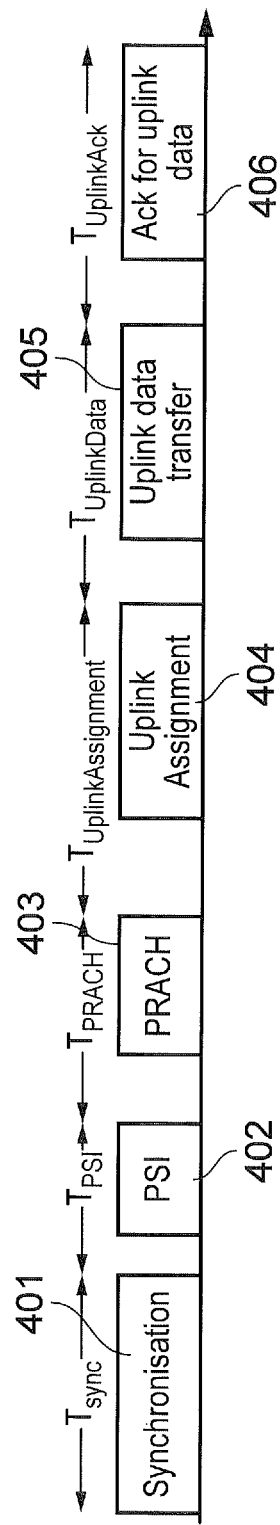
FIG. 4 provides a schematic representation of a time of transmission of a message from a communications device to an infrastructure equipment in accordance with a conventional arrangement showing a time of each part of a transmission process.

FIG. 3 provides a simplified schematic diagram of the structure of an uplink of an LTE wireless access interface that may be provided by or in association with the eNB of FIG. 1. In LTE networks the uplink wireless access interface is based upon a single carrier frequency division multiplexing FDM (SC-FDM) interface and downlink and uplink wireless access interfaces may be provided by frequency division duplexing (FDD) or time division duplexing (TDD), where in TDD implementations sub-frames switch between uplink and downlink sub-frames in accordance with predefined patterns. However, regardless of the form of duplexing used, a common uplink frame structure is utilised. The simplified structure of FIG. 4 illustrates such an uplink frame in an FDD implementation. A frame 300 is divided in to 10 sub-frames 301 of 1 ms duration where each sub-frame 301 comprises two slots 302 of 0.5 ms duration. Each slot is then formed from seven OFDM symbols 303 where a cyclic prefix 304 is inserted between each symbol in a manner equivalent to that in downlink sub-frames. More details of the LTE up-link represented in FIG. 3 are provided in Annex 1.

Narrow Band Carriers to Support IoT

There has been a proposal to configure a wireless communications system, which can support Narrowband Internet of Things (NB-IoT) devices [2], which is aimed at improved indoor coverage, support for a massive number of low throughput devices, low delay sensitivity, ultra-low device cost, low device power consumption and (optimised) network architecture. An example of such a device is a smart meter. NB-IoT occupies only 180 kHz of bandwidth and can have three operational modes:

1. 'Stand-alone operation' utilizing for example the spectrum currently being used by GERAN systems as a replacement of one or more GSM carriers
2. 'Guard band operation' utilizing the unused resource blocks within a LTE carrier's guard-band
3. 'In-band operation' utilizing resource blocks within a normal LTE carrier Although NB-IoT is delay tolerant, one of the requirements for NB-IoT is to be able to send an exception report within 10 seconds which spans the time from the UE obtaining synchronisation from the network until the time that the UE receives an acknowledgement for its report. Such a requirement would be useful in cases such as when NB-IoT is used for alarms, e.g. an alarm to indicate a meter being tampered with.

In order to transmit a message via a wireless access interface of a mobile communications system, it is necessary to perform certain tasks which each take a certain amount of time. FIG. 4 provides an illustration of discrete events, each of which requires time in order to transmit an alarm in NB-IOT (from 3GPPTR45.820 v.2.1.0 [3] section 7.3.6.3.1.1) from a UE to an eNB of a wireless communications system. As shown in FIG. 4 a first task 401 requires synchronization to the wireless access interface. A second task 402 requires the communications device to decode the system information of the wireless access interface provided by the eNB. A third task 403 requires the UE to form a connection with the eNB by performing a random access transmission. In a fourth task the eNB assigns uplink resources to the communications device 404 and in the process or task 405 the UE transmits data on the uplink. Finally, a process or task requests or provides an acknowledgement to the UE 406.

Example times required to deliver the alarm to the eNB (based on FIG. 4) are given in Table 1. These example timings are taken from 3GPPTR45.820 v.2.1.0 [3] section 7.3.6.3.1 and are appropriate for the standalone case when the UE is at the edge of coverage (164 dB coupling loss between the base station and UE). The time taken for downlink functions would be greater for the in-band case (where the DL power spectral density is significantly lower: see below).

TABLE 1

Time taken to deliver an alarm from UE to base station

| Step | direction | Time taken at 164 dB coupling loss |
| --- | --- | --- |
| Synchronisation | DL | 960 ms |
| PSI (primary system information) | DL | 810 ms |
| PRACH | UL | 644 ms |
| Uplink Assignment (PDCCH) | DL | 1090 ms |
| UL data transfer (105 byte packet) | UL | 2780 ms |
| Total time | | 6284 ms |

For stand-alone operation and guard band operation, where an independent power amplifier (PA) is used at the base station (eNB), the entire eNB power can be allocated for NB-IoT, which is beneficial to reach deep coverage. In the in-band case, where the DL power spectral density is lower, many repetitions of the DL signal are required to allow the signal to be successfully decoded at the UE. At a higher power spectral density, fewer repetitions are required. An example DL power spectral density for the standalone case would be 43 dBm TX power in 200 kHz bandwidth (50 dBm/MHz). Note that existing GSM carriers typically transmit this amount of power in a 200 kHz bandwidth.

For In-band operation (and Guard band operation that shares a PA with the LTE carrier), the eNB power needs to be shared between NB-IoT and legacy LTE transmissions and, for a fixed number of repetitions, does not have as good coverage as the cases where an independent PA is used (e.g. standalone and guardband with separate PA operation). For such operations, more repetitions are required in order to reach deep coverage. It should be appreciated that repetitions of the DL signal would increase latency and UE power consumption. The increase in latency for the alarm use case would not be acceptable, but the increase in power consumption might be acceptable (since the alarm is a high priority and infrequent event). An example DL power spectral density for the in-band case would be 43 dBm TX power in 10 MHz bandwidth (33 dBm/MHz). This power spectral density is 17 dB less than for the standalone case.

Embodiments of the present technique can provide an arrangement for transmitting emergency messages within a reduced time from that performed by the tasks say in FIG. 4.

Figure 5:
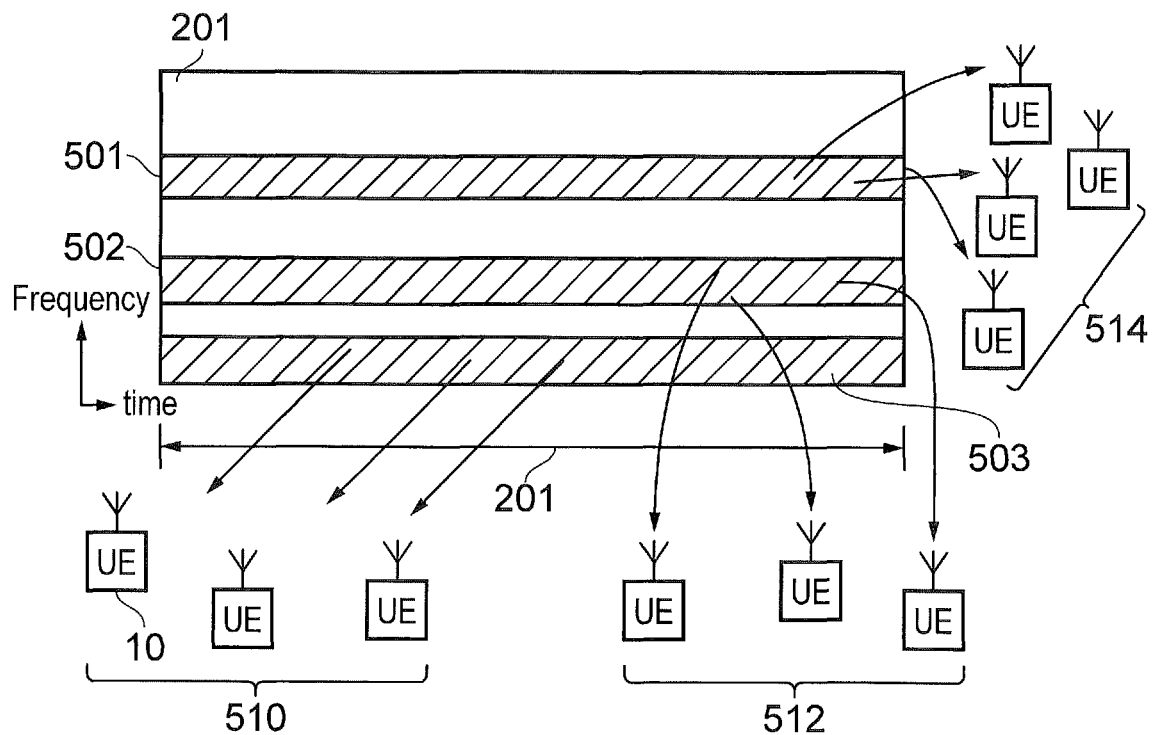
FIG. 5 provides an illustrative representation of a sub-frame of a wireless access interface providing a plurality of narrowband carriers.

FIG. 5 provides an illustrative representation of a sub-frame of the wireless access interface for downlink communications. As shown in FIG. 5 the time and frequency resources of a sub-frame 201 are divided into sections to provide three narrowband carriercarriers 501, 502, 503. The UEs within the cell served by the eNB are divided into groups so that a first group of UE's 510 receives downlink communications via the narrowband carriercarrier 503 whereas a second group of UEs 512 receives downlink communications from the second narrowband carriercarrier 502 and a third group of UEs 514 receives downlink communications from a third narrowband carrier 501.

Figure 6:
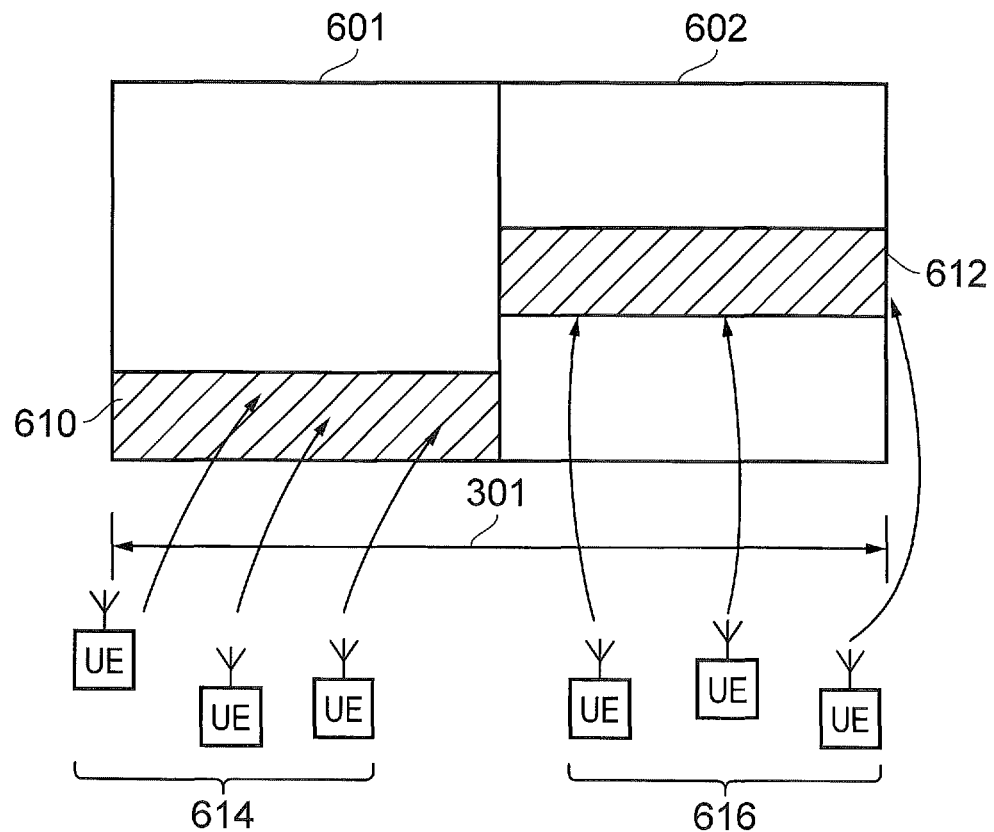
FIG. 6 provides an illustrative representation of an uplink of a wireless access interface providing a plurality of high priority uplink narrowband carriers.

Correspondingly the downlink of the wireless access interface may be divided into a plurality of sections which are dedicated for narrowband communications with certain types of UEs. As shown in FIG. 6 the downlink wireless interface is divided into two timeslots 601, 602 and in the example shown in FIG. 6 each of the timeslots includes a narrowband channel 610, 612. The duration of the timeslots could be less than the duration of an LTE subframe (e.g. of 0.5 ms duration), or could span one or more subframes of an LTE subframe. A first group of UEs 614 is arranged to transmit narrowband communications via the first narrowband carriercarrier 610 whereas a second group of UEs 616 transmits uplink communications via the second narrowband carriercarrier 612.

According to the present technique the ENode-b is configured to provide one of the narrowband carriers which is dedicated for the transmission of priority messages from the UEs. Accordingly transmissions via these dedicated high priority narrowband carriercarriers can be prioritized by increasing the transmission power of the signals within these narrowband carriercarriers above that for which the system was configured to temporarily reduce a transmission time for urgent messages on these narrowband carriercarriers. An example representation of a wireless access interface which is arranged to include a high priority narrowband carriercarrier is shown in FIGS. 7 and 8.

Figure 7:
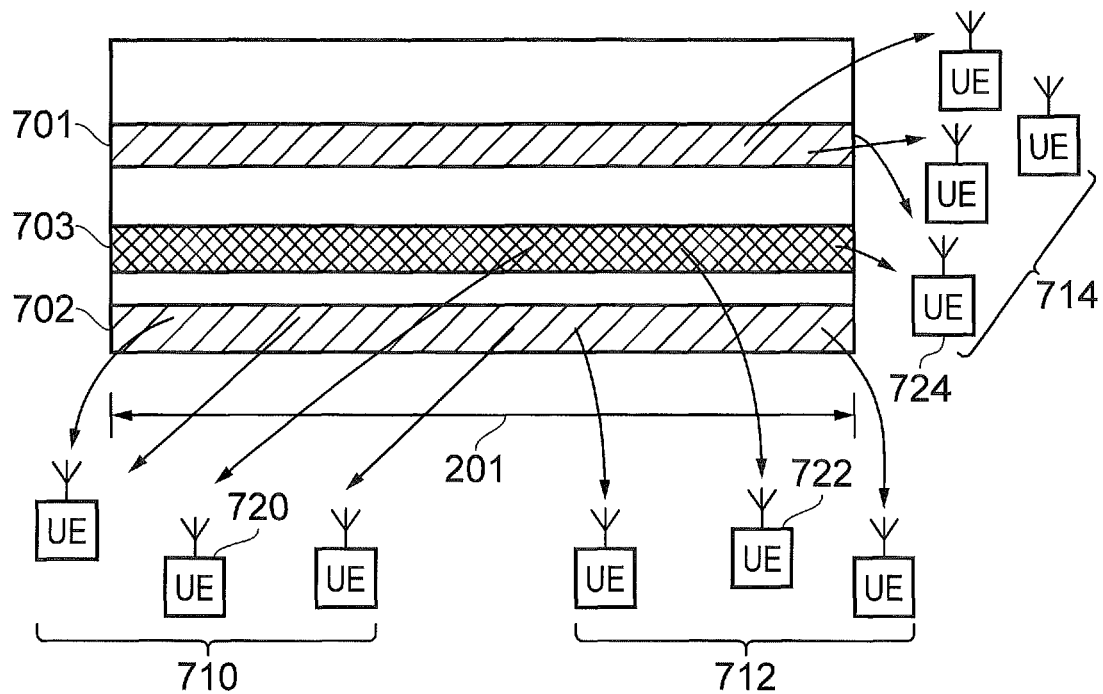
FIG. 7 is an illustrative representation of a downlink sub-frame which is configured to provide a plurality of narrowband carriers and a high priority narrowband carrier.

In FIG. 7 the downlink of the wireless access interface is arranged to include in addition to two narrowband carriercarriers 701, 702, a high priority narrowband carriercarrier 703. As such, as shown in FIG. 7 by the arrows representing transmission of signals from the eNB to the UE, although each of the groups of the UE's 710, 712, 714 was receiving downlink signals from one the narrowband carriercarriers, some of those UE's within the groups are receiving emergency messages and so receive downlink transmissions from the emergency narrowband carriercarrier 703. For example, UE 720, 722 and 724 receive downlink transmissions from the narrowband carriercarrier 703.

Figure 8:
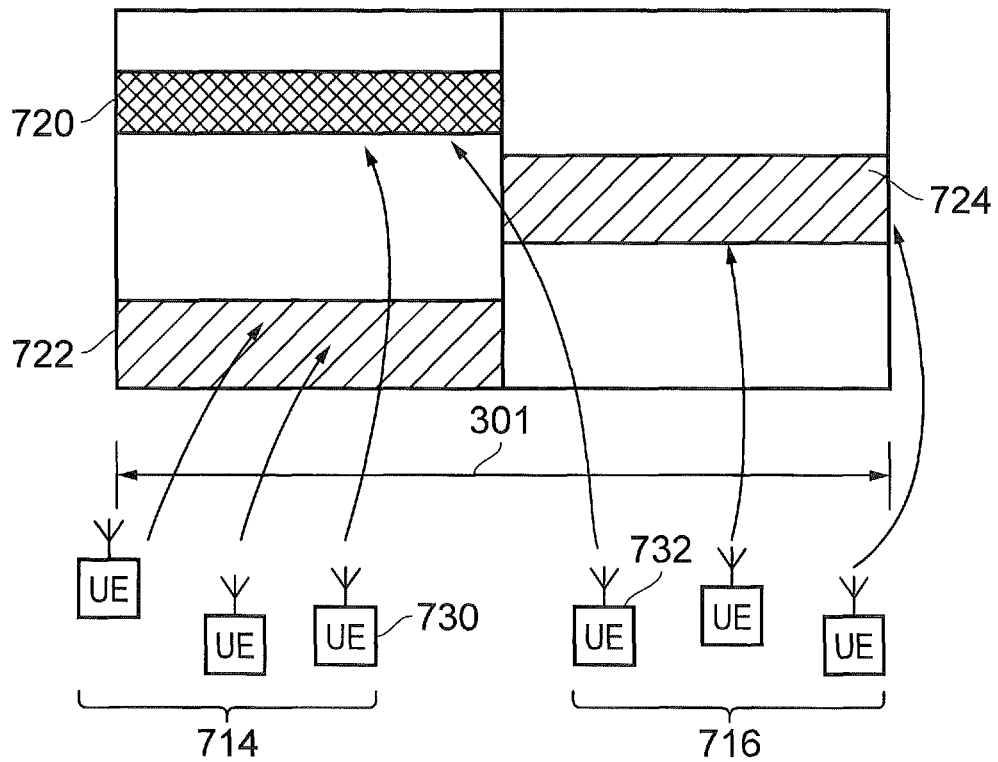
FIG. 8 is an illustrative representation of an uplink sub-frame which is configured to provide a plurality of narrowband carriers and a high priority narrowband carrier.

A corresponding arrangement from the uplink is shown in FIG. 8. As shown in FIG. 8, two of the UE's within the respective groups 714, 716 are arranged to transmit urgent messages via the dedicated narrowband carriercarrier 720 rather than the other narrowband carriercarriers 722, 724 which are used respectively by the other UEs within the groups 714, 716. Two UEs 730, 732 transmit via the high priority uplink narrowband carriercarrier and so can increase temporarily the power spectrum density of the transmissions in order to reduce a transmission time of the urgent messages. It will be appreciated that uplink transmissions can cause interference into neighbour cells. Hence the eNB might generally enforce a power spectral density limit for UEs to minimise such interference, but in the case shown in FIG. 8, the eNB raises that power spectral density limit in the high priority uplink narrowband 720.

For In-band operation, PSD (Power Spectral Density) boosting of up to 6 dB may be feasible, i.e., the eNB may "borrow" power from other downlink transmissions so that it can increase the power of one NB-IoT narrowband. This enables reduced repetition for operation in enhanced coverage. However, as discussed, PSD boosting (of 6 dB) is only feasible for a limited number of NB-IoT narrowband carriercarriers since the network still needs to maintain operation in other narrowbands and the LTE system that require power.

As will be appreciated from the above explanation, embodiments of the present technique can provide an arrangement in which at least one high priority NB-IoT narrowband carriercarrier is provided in the wireless access interface (down-link and/or up-link), which is used for high priority services such as alarm triggering. Embodiments can arrange for transmissions in the high priority narrowband to be PSD boosted (possibly to the maximum possible level). As a result a repetition of signals can be reduced in the PSD boosted narrowband, so that high priority NB-IoT devices that are in poor coverage can gain access to the network (e.g., obtaining synchronisation and reading the common channels such as system information, such as the Master Information Block (MIB) and System Information Blocks (SIB)) faster. It will be appreciated that in addition to sending the exception report, additional messages between this high priority device and the network may be required and these messages would also benefit from the reduced repetitions in the downlink.

In some embodiments, the high priority narrowband carriercarrier is identified by a different set of synchronisation signal (i.e. PSS/SSS) to those used for normal priority narrowband. Hence, a UE that requires high priority narrowband would search for PSS/SSS that correspond to high priority narrowband carriercarriers.

In other embodiments the attributes of the high priority narrowband resources, such as time and frequency location, are signalled in common channel such as SIB. These high priority narrowband resources are known to not change for a certain period of time. For example, the eNB could signal in system information:

The set of high priority narrowband resources that are assigned. Examples are:
Location of DL narrowband to use for the high priority resource Location of UL resources to use to transmit a high priority message The UL resources may be described in detail. E.g. UL resource 1=(set of subcarriers, set of timeslots, modulation, transport block size etc.), UL resource set 2={ ... }

The time period over which those high priority narrowband resources are valid

E.g. High priority resources are valid for 24 hours. In this case, the UE needs to re-read system information every 24 hours to determine whether alarm resources have changed and, if so, the new alarm resources In others embodiments, the location of the high priority narrowband is predefined in the specification and is known to the UE.

In other embodiments, the high priority narrowband can be enabled or disabled, i.e. it can be switched off. This allows the eNB flexibility in managing its power resource. When the high priority narrowband is switched off, it can be indicated in the SIB (e.g. in the primary narrowband if one is defined) or it can switch its PSS/SSS from a high priority sync sequence to one that has normal priority.

For In-band operation, a primary (or anchor) narrowband for NB-IoT may be defined within the system bandwidth where the primary narrowband contains at least a synchronisation signal and broadcast messages such as MIB and SIB. The UE would firstly be attached to the primary narrowband and may be moved to another (secondary) narrowband for further service. In other embodiments, the location of the high priority narrowband is indicated in the primary narrowband.

After obtaining sync and system information, a UE with high priority service can move (i.e. retune) to the high priority narrowband to access the network (i.e. perform random access, e.g. via a RACH (Random Access Channel) procedure).

It will be appreciated that in addition to high priority service, the high priority narrowband can be used to serve UEs in deep coverage. That is the additional power in this high priority narrowband is used to further enhance coverage.

Frequency hopping can be used to improve the performance of the transmission by providing frequency diversity. Frequency hopping can be applied to NB-IoT where the frequency location of the narrowband changes in time. If frequency hopping is used on the high priority narrowband and the high priority narrowband is also power boosted, then the eNB would perform PSD boosting on the narrowbands where this high priority narrowband hops to. The hopping pattern is signalled to the UE or known implicitly e.g. from other parameters such as the first location of the high priority narrowband, system bandwidth, etc. In some embodiments, narrowbands for normal NB-IoT services do not employ frequency hopping and narrowbands supporting high priority services do employ frequency hopping. In such an arrangement, transmissions on the high priority narrowbands take less time since fewer repetitions are required on the frequency hopped narrowbands that experience superior performance.

The high priority narrowband resources can be DL power boosted and can include:

Synchronisation signal (DL power boosted)

The high priority synchronisation signal can be shorter than the normal NB-IOT synchronisation signal. E.g. the synchronisation signal might include less cell identification information (noting that alarms are infrequent and if alarms cause some interference between neighbour cells, then the consequences are not severe)

Basic system information (DL power boosted)

E.g. to describe whether there have been any changes since system information was last read by a UE. This might be by simply including the "system information sequence number" in the basic system information (if this differs from the sequence number previously read in the full system information, the UE will need to re-read the most up to date full system information)

E.g. to describe how much UL resource has been assigned to high priority messages. This might be encoded as a list of the UL resources signalled by the full system information (e.g. tag of UL resource set 1, UL resource set 2). This encoded list in the full system information is a list of "high priority UL resources".

UL resources to be used for high priority messages

A set of UL resources to be used for random access messages associated with high priority messages A set of UL resources to be used for transporting the high priority messages. These UL resources would be consistent with the "high priority UL resources" previously signalled in the full system information The method of operation described above reduces the time required to transmit the high priority message through the following features:

DL signals are power boosted

DL and UL signals may employ frequency hopping

Sychronisation signals may be shorter

Very few bits of system information need to be read at the time of the alarm (the cached full system information is usually used)

UL assignment messages (received in the DL by the UE) are only a few bits long

Note that when the eNB assigns high priority resources in the network, it may inform other (normal priority) UEs that those resources are no longer available. This would typically be achieved by not scheduling other UEs in the high priority narrowband resources, however if the high priority resources used resources that were previously semi-persistently scheduled to other UEs, those other UEs would have their semi-persistently scheduled resources de-assigned (and possibly re-assigned elsewhere).

UE Instantiated Narrow-Band Carrier

For In-band operation (and Guard band operation that shares a PA with the LTE carrier), the eNB power needs to be shared between NB-IoT and conventional LTE transmissions and, for a fixed number of repetitions, does not have as good coverage as the cases where an independent PA is used (e.g. standalone and guard-band with separate PA operation). For such operations, more repetitions are required in order to reach deep coverage. It should be appreciated that repetitions of the DL signal would increase latency and UE power consumption. The increase in latency may not be acceptable for some NB-IoT services such as an alarm trigger. An example DL power spectral density for the in-band case would be 43 dBm TX power in 10 MHz bandwidth (33 dBm/MHz). This power spectral density is 17 dB less than for the standalone case.

As mentioned above, with In-band operation, PSD (Power Spectral Density) boosting of up to 6 dB may be feasible, which is arranged by the eNB. The eNB may "borrow" power from other downlink transmissions so that it can increase the power of one NB-IoT narrowband. This enables reduced repetition for operation in enhanced coverage. However PSD boosting (of 6 dB) is only feasible for a limited number of narrowband carriercarriers since the network still needs to maintain operation in other narrowbands or portions of the DL spectrum that requires power.

According to the examples presented above, a PSD boosted narrowband carriercarrier is used as a high priority narrowband that is reserved for services requiring this extra boost such as a high a priority alarm trigger or to provide additional coverage beyond that provided by coverage enhancement (that uses repetitions). According to this embodiment a semi-static PSD boosting on a narrowband carriercarrier is provided where the location of this narrowband does not change frequently and it is up to the UE to discover and use it. PSD boosting of a narrowband for a long period of time may not be beneficial in terms of power resource usage since power is "borrowed" from other narrowbands and legacy LTE operation. It is therefore beneficial that PSD boosting is only used when necessary.

An embodiment of the present technique can therefore provide an arrangement in which a UE is arranged to provide an indication that it needs to use a PSD boosted narrowband. For example, the UE can indicate that it is performing a high priority service such as an alarm trigger at a poor radio coverage. Upon receiving this indicator, the eNB can then decide whether to PSD boost the narrowband (e.g. the downlink narrowband corresponding to the uplink narrowband where the UE sends this indication). If the eNB has already assigned another narrowband with PSD boosting, it can then direct this UE to that narrowband. Alternatively the UE can determine the location of the PSD boosted narrowband by searching for a synchronisation signal of the PSD boosted narrowband.

Figure 9:
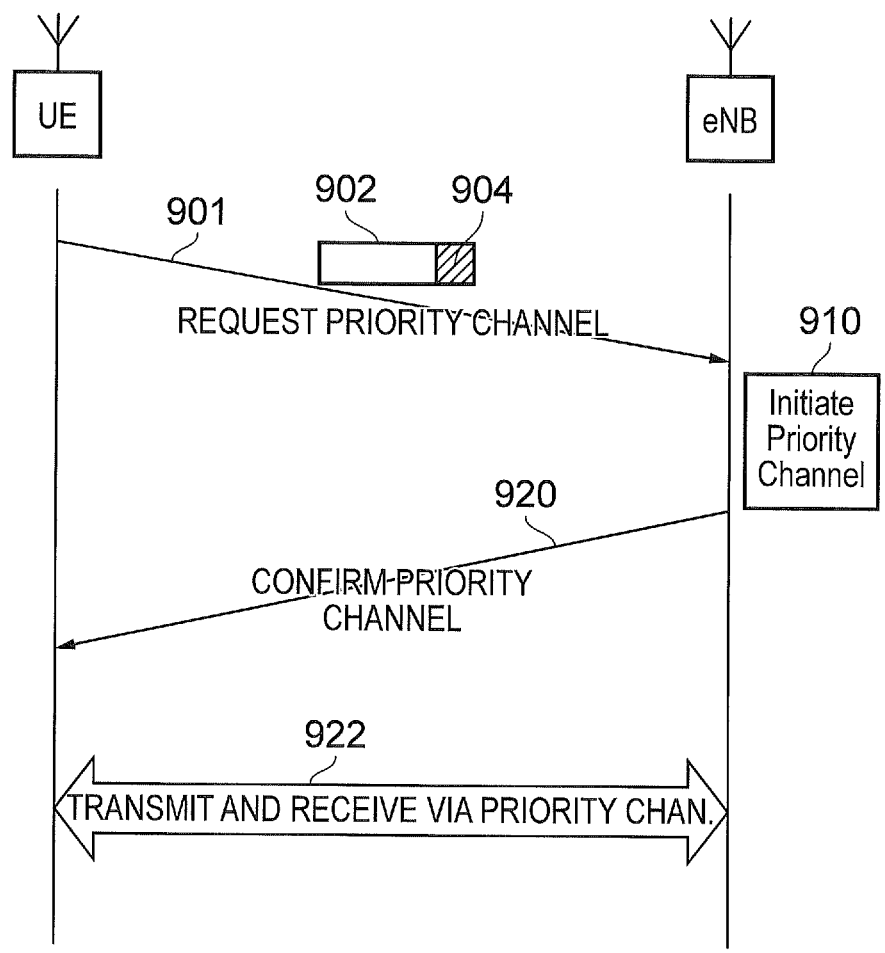
FIG. 9 is an illustrative representation of a message exchange diagram in which a narrowband communications device requests transmission of a high priority message to establish a power boosted communication.

According to a further example embodiment of the present technique a UE may request urgent transmission of a message to the eNB via one of the narrowband carriercarriers (whether this is dedicated for urgent communications or not). As shown in FIG. 9 with the transmission of a message represented by an arrow 901, the UE transmits a message 902 including a dedicated bit 904 which indicates that the UE wishes to transmit a high priority message. At process steps 910 the eNB either configures its receiver to receiver a high priority transmission from the UE or configures a high priority narrowband carriercarrier 703, 720. At process step 910, one example method by which the eNB configures its receiver to receive a high priority transmission from the UE is to configure its receiver to receive a frequency hopped transmission from the UE. The eNB then transmits a confirmation message that the high priority message can be transmitted from the UE or transmitted on a high priority narrowband carriercarrier with a message represented by an arrow 920. Thereafter the UE can exchange high priority communications with the eNB as represented by a double headed arrow 922.

In some embodiments, a set of uplink resource is reserved for PSD boosting indication. This resource is indicated in the SIB. For example, a set of random access indicators ((PRACH) preambles) can be reserved for a PSD boosting indication. A UE requiring PSD boosted downlink would use these reserved random access indicators when performing a random access process. The eNB can therefore identify UEs with high priority service by these preambles. The eNB may in some cases not be able to identify the specific UE that requires high priority services, but if it can identify that at least (unknown) UE requires high priority services, it can instantiate the high priority narrowband. Similarly a set of frequency and/or time resources (which need not be for PRACH) can be indicated in the SIB that the UE can use to send a signal indicating its need for PSD boosting in the downlink or uplink. This uplink resource can be used even when UE is in connected state (since the UE may move to an area of poorer radio coverage and in need for PSD boosting).

In other embodiments, there is a link between the reserved uplink resource and the downlink narrowband. It will be appreciated that in some embodiments it is only the downlink narrowband that is PSD boosted. The UE when using a specific reserved UL resource would need to know which downlink narrowband will be boosted. This downlink narrowband can for example be the same downlink narrowband containing the details of the uplink resource (broadcast in the SIB), i.e., each downlink narrowband broadcasts a single uplink resource for this indication. Alternatively, a downlink narrowband can indicates all the UL resources for the PSD boosting indication and in this case, it also needs to either explicitly or implicitly indicate the corresponding downlink narrowband that may be PSD boosted.

In other embodiments, the UE transmits a known tone (e.g. a subcarrier tone) as a means of a PSD boosting indication, in one of the reserved uplink resources. This UE transmission may have rough time and/or frequency synchronisation with the network. However when the eNB allocates sufficient resources to receive this roughly synchronised signal, the deleterious interference to other signals can be minimised. The eNB monitors this reserved UL resource (e.g. performing energy detection in the alarm request reserved UL resources). If the eNB determines that there is energy present in the alarm request resources, it instantiates PSD boosting on the corresponding downlink narrowband. Note that the eNB does not need to know how many UEs sent an indication as long as at least one UE sends an indication, the eNB can take the decision to perform PSD boosting on a known downlink narrowband. In an example implementation, after the UE sends an indication, e.g. in the form of an uplink tone in the reserved uplink resource, it would take the following actions:

- Decode the DL power boosted synchronisation signal to establish time and frequency synchronisation
- Decode the DL power boosted basic system information to determine:
  - whether full system information needs to be read (an unlikely event)
- Transmits a short random access message requesting UL resource
- Receives a DL power boosted UL assignment from the eNB that indicates the UL resources that the UE can use for its message. The DL assignment could contain very few bits, e.g. signalling to the UE only which UL resource set should be used (maybe 2 bits of information, e.g. the DL assignment could indicate that "UL resource set 1" is to be used)
- Transmitting the UL message, e.g. such as an alarm report Hence by receiving an indication from the UE(s) of the need for downlink PSD boosted narrowband communication, the eNB can take action to PSD boost a narrowband. It can also convert that PSD boosted narrowband to a high priority narrowband as explained for the above embodiments, where in addition to PSD boosting in the downlink, it can also have shortened PSS/SSS and reduced SIB messages to enable UE to gain faster access to the network.

In other embodiments the UE indicates that it needs PSD boosting in the downlink e.g. for high priority service at poor radio coverage in the RRC Request message. This is typically the first (data) message the UE sends to the network. An indication bit can be added to this message for this purpose.

It is possible that a connected UE (i.e. after establishing RRC connection) may need to operate with downlink PSD boosting (e.g. the coverage becomes poorer or there is a need to send a high priority message such as an alarm trigger). Therefore in an embodiment, the UE can send a message such as an RRC message to the network indicating that it is performing a high priority service.

In other embodiments, a connected UE indicates that it is going to require downlink PSD boosting using a MAC message send using the PUSCH.

In other embodiments, a connected UE indicates that it is going to require downlink PSD boosting using a physical channel such as PUCCH.

The UE can decide whether it needs to indicate that it wishes for downlink PSD boosting to be applied by considering whether it is in a poor coverage (e.g. based on path loss measurements using e.g. RSRP measurements). Another consideration is whether it needs to perform a high priority service such as an alarm trigger which may have lower tolerance to latency. If the coverage is sufficient (e.g. above a predefined threshold such as coupling loss between UE and eNB of 145 dB or less), the UE can use normal resource and therefore does not need to perform any indication. If the coverage is poor and/or the UE requires high priority service then an uplink indication for the need of downlink PSD boosting can be indicated.

It should be appreciated that such indications do not in themselves lead to a narrowband being PSD boosted since this depends on whether the eNB has enough power resource. The eNB can use the indications to perform a decision on whether to perform PSD boosting on a narrowband. The eNB for example may only PSD boost a narrowband if the number of UEs performing high priority service exceeds a threshold. Another example is if the energy level of a reserved uplink resource (where UE sends a tone indicatior) is high, it can PSD boost the corresponding downlink narrowband.

Various further aspects and features of the present invention are defined in the following numbered paragraphs:

Paragraph 1. An infrastructure equipment for transmitting data to or receiving data from one or more communications devices in a wireless communications network, the infrastructure equipment comprising
a transmitter configured to transmit signals to the one or more communications devices via a wireless access interface,
a receiver configured to receive signals from one or more of the communications devices via the wireless access interface, and a controller configured to control the transmitter and a receiver to provide the wireless access interface, the wireless access interface providing communications resources arranged in time divided units of a system bandwidth providing a plurality of blocks of frequency resources, wherein the controller is configured with a transmitter and a receiver
to provide one or more narrowband carriers, each carrier providing within a sub-band frequency bandwidth communications resources for allocation to narrow band communications devices, the sub-band frequency bandwidth being less than and within the system bandwidth, signals being transmitted to the narrowband communications devices via the narrow band carriers in accordance with first configuration,
to transmit signals on the down-link of a narrowband carrier to a narrow-band communications device with second configuration, which is different to the first configuration with the effect of reducing a time for communicating a high priority message transmitted to the narrowband communications devices.

Paragraph 2. An infrastructure equipment according to paragraph 1, wherein the first configuration includes transmitting the signals with a first power, and transmitting the signals with the second configuration includes increasing the power of the signals above the first power to a second power to reduce a time of communicating a high priority message transmitted to the narrowband communications device.

Paragraph 3. An infrastructure equipment according to paragraph 1 or 2, wherein the controller in combination with the transmitter and the receiver is configured
to transmit signals on the down-link of the narrowband carrier to the narrow-band communications device with the second configuration in response to receiving a request to transmit the high priority message from the narrowband communications device.

Paragraph 4. An infrastructure equipment according to paragraph 2, wherein the receiver is configured to receive a control message which represents the request to transmit the high priority message from the narrowband communications device.

Paragraph 5. An infrastructure equipment according to paragraph 3, wherein the control message is a random access message which includes a predetermined number which indicates a request to transmit the high priority message.

Paragraph 6. An infrastructure equipment according to paragraph 2, 3 or 4, wherein a down-link of the one or more narrowband carriers is paired with an up-link of the narrowband carriers, and the controller is configured with the transmitter and the receiver to transmit the signals with the second configuration on the down-link of a narrowband carrier which is paired with the uplink on which the request to transmit the high-priority message is received.

Paragraph 7. An infrastructure equipment according to any of paragraphs 1 to 6, wherein the controller in combination with the transmitter and the receiver is configured to form a high priority narrowband carrier for the down-link and the uplink of the wireless access interface from one of the one or narrowband carriers, wherein the high priority narrowband subcarrier is the narrowband subcarrier in which signals are transmitted on the down-link with the second configuration to the narrowband communications device or one or more other narrowband communications devices.

Paragraph 8. An infrastructure equipment according to paragraph 7, wherein the controller in combination with the transmitter is configured to transmit an indication and a location of the high priority narrowband carrier on system information broadcast to the narrowband communications devices.

Paragraph 9. An infrastructure equipment according to paragraph 6, wherein the controller in combination with the transmitter is configured to transmit a synchronisation signal for each of the narrowband carriers, the narrowband communications devices being configured to search for the synchronisation signal to identify a narrowband carrier, wherein the first configuration includes a first synchronisation signal and the second configuration is a different synchronisation signal for the high priority narrowband carrier.

Paragraph 10. An infrastructure equipment according to any of paragraphs 1 to 9, wherein the one or more narrowband subcarriers includes a primary narrowband carrier, and the controller is configured with the transmitter to transmit an indication of the primary narrowband carrier, the narrowband communications devices being configured to transmit signals to or receive signals from the primary narrowband carrier before the high priority narrow band carrier or another narrowband carrier.

Paragraph 11. An infrastructure equipment according to any of paragraphs 6 to 10, wherein the controller and the transmitter are configured to transmit on the downlink of the high priority narrowband carrier a shortened synchronisation signal compared with a synchronisation signal transmitted on one or more other narrowband carriers.

Paragraph 12. An infrastructure equipment according to any of paragraphs 6 to 11, wherein the controller and the transmitter are configured to transmit on the downlink of the high priority narrowband carrier a shortened system information signal compared with a system information signal transmitted on one or more other narrowband carriers, the system information providing an indication of one or more parameters of the narrowband subcarrier.

Paragraph 13. A method of transmitting data to or receiving data from one or more communications devices in a wireless communications network, the infrastructure equipment comprising:
- transmitting signals to the one or more communications devices via a wireless access interface,
- receiving signals from one or more of the communications devices via the wireless access interface, the wireless access interface providing communications resources arranged in time divided units of a system bandwidth providing a plurality of blocks of communications resources, and including one or more narrowband carriers, each carrier providing within a carrier frequency bandwidth communications resources for transmitting signal to narrow band communications devices on a downlink or receiving signals from the narrowband communications devices on an uplink, the carrier bandwidth being less than and within the system bandwidth, and signals transmitted to the narrowband communications devices or received from the narrowband communications devices via the narrow band carriers are transmitted with a first configuration, and
- transmitting signals on the down-link of a narrowband carrier to a narrow-band communications device with a second configuration which is different to the first configuration with the effect of reducing a time for communicating a high priority message transmitted to the narrowband communications devices.

Paragraph 14. A communications device for transmitting data to or receiving data from an infrastructure equipment of a wireless communications network, the communications device comprising
- a transmitter configured to transmit signals to the infrastructure equipment via a wireless access interface.
- a receiver configured to receive signals from the infrastructure equipment via the wireless access interface, the wireless access interface providing communications resources arranged in time divided units of a system bandwidth providing a plurality of frequency resources, and
- a controller is configured to control the transmitter and the receiver to transmit the signals to or receive the signals from one or more narrowband carriers, each carrier providing within a carrier frequency bandwidth communications resources for allocation to narrow band communications devices, the carrier bandwidth being less than and within the system bandwidth, signals received from the infrastructure via the narrow band carriers having been transmitted with a first configuration, and
- to receive signals on the down-link of a narrowband carrier with a second configuration which is different to the first configuration with the effect of reducing a time for communicating a high priority message transmitted to the narrowband communications devices.

Paragraph 15. A communications device according to paragraph 14, wherein the first configuration includes transmitting the signals with a first power, and transmitting the signals with the second configuration includes increasing the power of the signals above the first power to a second power to reduce a time of communicating a high priority message transmitted to the narrowband communications device.

Paragraph 16. A communications device according to paragraph 14 or 15, wherein the controller in combination with the transmitter and the receiver is configured
- to transmit a request to transmit the high priority message to the infrastructure equipment, and
- to receive signals on the down-link of the narrowband carrier which have been transmitted from the infrastructure equipment with an increased power in response to the infrastructure equipment receiving the request.

Paragraph 17. A communications device according to paragraph 14, wherein the controller is configured to transmit a control message which represents the request to transmit the high priority message to the infrastructure equipment.

Paragraph 18. A communications device according to paragraph 17, wherein the control message is a random access message which includes a predetermined number which indicates a request to transmit the high priority message.

Paragraph 19. A communications device according to paragraph 17 or 18, wherein a down-link of the one or more narrowband carriers is paired with an up-link of the narrowband carriers, and the controller is configured with the transmitter and the receiver
- to transmit the request to transmit the high-priority message on the uplink which is paired with the downlink narrowband carrier on which the signals are received which have been transmitted by the infrastructure equipment with the second power.

Paragraph 20. A communications device according to any of paragraphs 15 to 20, wherein the controller in combination with the transmitter and the receiver is configured to form Paragraph 21. A communications device according to any of paragraphs 15 to 20, wherein the controller in combination with the receiver is configured
- to receive an indication and a location of a high priority narrowband carrier, the high priority narrowband carrier being formed for the down-link and the uplink of the wireless access interface from one of the one or narrowband carriers, wherein the high priority narrowband subcarrier is the narrowband subcarrier in which signals are received on the down-link with the second power.

Paragraph 22. A communications device according to paragraph 21, wherein the controller in combination with the receiver is configured to search for a synchronisation signal which is transmitted by the infrastructure equipment for each of the narrowband carriers, wherein the high priority narrowband carrier has a different synchronisation signal to the one or more other narrowband carriers.

Paragraph 23. A communications device according to any of paragraphs 15 to 22, wherein the controller in combination with the transmitter and the receiver is configured to receive an indication of that one of the one or more narrowband carriers is a primary narrowband carrier, to transmit signals to or receive signals from the primary narrowband carrier before the high priority narrow band carrier or another narrowband carrier.

Paragraph 24. A communications device according to any of paragraphs 15 to 23, wherein the controller is configured with the receiver to receive on the downlink of the high priority narrowband carrier a shortened synchronisation signal compared with a synchronisation signal transmitted on one or more other narrowband carriers.

Paragraph 26. A communications device according to any of paragraphs 17 to 24, wherein the controller and the transmitter are configured to receive on the downlink of the high priority narrowband carrier a shortened system information signal compared with a system information signal received on one or more other narrowband carriers, the system information providing an indication of one or more parameters of the narrowband subcarrier.

Paragraph 27. A method of transmitting data from a communications device to an infrastructure equipment of a wireless communications network, the method comprising transmitting signals to the infrastructure equipment via a wireless access interface, receiving signals from the infrastructure equipment via the wireless access interface, the wireless access interface providing communications resources arranged in time divided units of a system bandwidth providing a plurality of blocks of communications resources, wherein the transmitting or the receiving comprises transmitting the signals to or receiving the signals from one or more narrowband carriers of the wireless access interface, each carrier providing within a carrier frequency bandwidth communications resources for allocation to narrow band communications devices, the carrier bandwidth being less than and within the system bandwidth, signals received from the infrastructure via the narrow band carriers having been transmitted with a first power, and the receiving includes receiving signals on the down-link of a narrowband carrier with an increased power, the power of the signals being increased above the first power to a second power to reduce a time of communicating a high priority message transmitted to or received from the infrastructure equipment.

Paragraph 29. A wireless communications system comprising an infrastructure equipment according to Claims 1 or 18 and a communications device according to Claim 8, 13 or 23.

Paragraph 30. An infrastructure equipment for transmitting data to or receiving data from one or more communications devices in a wireless communications network, the infrastructure equipment comprising:

a transmitter configured to transmit signals to the one or more communications devices via a wireless access interface, a receiver configured to receive signals from one or more of the communications devices via the wireless access interface, and a controller configured to control the transmitter and a receiver to provide the wireless access interface, the wireless access interface providing communications resources arranged in time divided units of a system bandwidth providing a plurality of blocks of communications resources, wherein the controller is configured with a transmitter and a receiver to provide one or more narrowband carriers, each narrowband carrier providing within a sub-band frequency bandwidth communications resources for allocation to narrow band communications devices, the sub-band bandwidth being less than and within the system bandwidth, and signals transmitted to the narrowband communications devices or received from the narrowband communications devices via the narrowband carriers are transmitted using a first configuration, to transmit signals on the down-link of a narrowband carrier to a narrow-band communications device with a second configuration, the second configuration that is suitable for of message with reduced delay or increase coverage.

Paragraph 31. An infrastructure equipment as in Paragraph 30, where the first configuration is a transmission power using a first power and the second configuration is transmission using a second power, where the second power is stronger than the first power Paragraph 32. An infrastructure equipment as in Paragraph 30, where the first configuration is a synchronisation signal with a first length and the second configuration is a synchronisation signal with a second length where the second length is shorter than the first length Paragraph 33. An infrastructure equipment as in Paragraph 30, where the first configuration consists of a first set of system broadcast information and the second configuration consists of a second set of system broadcast information where the second set of system broadcast information has less information than that of the first set of system broadcast information The high priority narrowband can have a combination of higher power, shorter sync sequence and smaller SIB.

REFERENCES

[1] LTE for UMTS: OFDMA and SC-FDMA Based Radio Access, Harris Holma and Antti Toskala, Wiley 2009, ISBN 978-0-470-99401-6.

[2] RP-151621, "New Work Item: NarrowBand IOT (NB-IOT)." Qualcomm, RAN#69

[3] 3GPPTR45.820 v.2.1.0 "Cellular System Support for Ultra Low Complexity and Low Throughput"

Annex 1:

As shown in FIG. 4, each LTE uplink sub-frame may include a plurality of different channels, for example a physical uplink communications channel (PUSCH) 305, a physical uplink control channel (PUCCH) 306, and a physical random access channel (PRACH). The physical Uplink Control Channel (PUCCH) may carry control information such as ACK/NACK to the eNB for downlink transmissions, scheduling request indicators (SRI) for UEs wishing to be scheduled uplink resources, and feedback of downlink channel state information (CSI) for example. The PUSCH may carry UE uplink data or some uplink control data. Resources of the PUSCH are granted via PDCCH, such a grant being typically triggered by communicating to the network the amount of data ready to be transmitted in a buffer at the UE. The PRACH may be scheduled in any of the resources of an uplink frame in accordance with a one of a plurality of PRACH patterns that may be signalled to UE in downlink signalling such as system information blocks. As well as physical uplink channels, uplink sub-frames may also include reference signals. For example, demodulation reference signals (DMRS) 307 and sounding reference signals (SRS) 308 may be present in an uplink sub-frame where the DMRS occupy the fourth symbol of a slot in which PUSCH is transmitted and are used for decoding of PUCCH and PUSCH data, and where SRS are used for uplink channel estimation at the eNB. The ePDCCH channel carries similar control information (DCI) as the PDCCH, but the physical aspects of PDCCH are different to those of ePDCCH, as discussed elsewhere herein. Further information on the structure and functioning of the physical channels of LTE systems can be found in [1].

In an analogous manner to the resources of the PDSCH, resources of the PUSCH are required to be scheduled or granted by the serving eNB and thus if data is to be transmitted by a UE, resources of the PUSCH are required to be granted to the UE by the eNB. At a UE, PUSCH resource allocation is achieved by the transmission of a scheduling request or a buffer status report to its serving eNB. The scheduling request may be made, when there is insufficient uplink resource for the UE to send a buffer status report, via the transmission of Uplink Control Information (UCI) on the PUCCH when there is no existing PUSCH allocation for the UE, or by transmission directly on the PUSCH when there is an existing PUSCH allocation for the UE. In response to a scheduling request, the eNB is configured to allocate a portion of the PUSCH resource to the requesting UE sufficient for transferring a buffer status report and then inform the UE of the buffer status report resource allocation via a DCI in the PDCCH. Once or if the UE has PUSCH resource adequate to send a buffer status report, the buffer status report is sent to the eNB and gives the eNB information regarding the amount of data in an uplink buffer or buffers at the UE. After receiving the buffer status report, the eNB can allocate a portion of the PUSCH resources to the sending UE in order to transmit some of its buffered uplink data and then inform the UE of the resource allocation via a DCI in the PDCCH. For example, presuming a UE has a connection with the eNB, the UE will first transmit a PUSCH resource request in the PUCCH in the form of a UCI. The UE will then monitor the PDCCH for an appropriate DCI, extract the details of the PUSCH resource allocation, and transmit uplink data, at first comprising a buffer status report, and/or later comprising a portion of the buffered data, in the allocated resources.

Although similar in structure to downlink sub-frames, uplink sub-frames have a different control structure to downlink sub-frames, in particular the upper 309 and lower 310 subcarriers/frequencies/resource blocks of an uplink sub-frame are reserved for control signaling rather than the initial symbols of a downlink sub-frame. Furthermore, although the resource allocation procedure for the downlink and uplink are relatively similar, the actual structure of the resources that may be allocated may van due to the different characteristics of the OFDM and SC-FDM interfaces that are used in the downlink and uplink respectively. In OFDM each subcarrier is individually modulated and therefore it is not necessary that frequency/subcarrier allocation are contiguous however, in SC-FDM subcarriers are modulated in combination and therefore if efficient use of the available resources are to be made contiguous frequency allocations for each UE are preferable.

The invention claimed is:

1. An infrastructure equipment for transmitting data to or receiving data from one or more communications devices in a wireless communications network, the infrastructure equipment comprising:
    a transmitter configured to transmit signals to the one or more communications devices via a wireless access interface;
    a receiver configured to receive signals from the one or more of the communications devices via the wireless access interface; and
    circuitry configured to control the transmitter and a receiver to provide the wireless access interface, the wireless access interface providing communications resources arranged in time divided units of a system bandwidth providing a plurality of blocks of frequency resources, wherein
    the circuitry is configured with the transmitter and the receiver to
        provide one or more narrowband carriers, each carrier providing within a subband frequency bandwidth communications resources for allocation to narrow band communications devices, the subband frequency bandwidth being less than and within the system bandwidth, signals being transmitted to the narrowband communications devices via the one or more narrow band carriers in accordance with a first configuration;
    receive a control message representing a request to transmit a high priority message from at least one of the narrowband communications devices; and
    transmit signals on a down-link of a narrowband carrier to the at least one of the narrowband communications devices with a second configuration, wherein the first configuration includes transmitting the signals with a first power, and transmitting the signals with the second configuration includes increasing a power of the signals above the first power to a second power to reduce a time for communicating a high priority message transmitted to the at least one of the narrowband communications devices.

2. The infrastructure equipment of claim 1, wherein the downlink of the one or more narrowband carriers is paired with an uplink of the one or more narrowband carriers, and the circuitry is configured with the transmitter and the receiver to transmit the signals with the second configuration on the downlink of a narrowband carrier which is paired with the uplink of the one or more narrowband carriers on which a request to transmit the high priority message is received.

3. The infrastructure equipment of claim 2, wherein the circuitry in combination with the transmitter is configured to transmit a synchronisation signal for each of the one or more narrowband carriers, the narrowband communications devices being configured to search for the synchronisation signal to identify a narrowband carrier, wherein the first configuration includes a first synchronisation signal and the second configuration is a different synchronisation signal for the high priority narrowband carrier.

4. The infrastructure equipment of claim 2, wherein the circuitry and the transmitter are configured to transmit on the downlink of a high priority narrowband carrier a shortened synchronisation signal compared with a synchronization signal transmitted on one or more other narrowband carriers.

5. The infrastructure equipment of claim 2, wherein the circuitry and the transmitter are configured to transmit on the downlink of a high priority narrowband carrier a shortened system information signal compared with a system information signal transmitted on the one or more other narrowband carriers, the system information providing an indication of one or more parameters of the narrowband carrier.

6. The infrastructure equipment of claim 1, wherein the control message is a random access message which includes a predetermined number which indicates a request to transmit the high priority message.

7. The infrastructure equipment of claim 1, wherein
the circuitry in combination with the transmitter and the receiver is configured to form a high priority narrowband carrier for the downlink and the uplink of the wireless access interface from one of the one or more narrowband carriers, wherein the high priority narrowband carrier is the narrowband carrier in which signals are transmitted on the downlink with the second configuration to the at least one of the narrowband communications devices or one or more other narrowband communications devices.

8. The infrastructure equipment of claim 7, wherein
the circuitry in combination with the transmitter is configured to transmit an indication and a location of the high priority narrowband carrier on system information broadcast to the narrowband communications devices.

9. The infrastructure equipment of claim 1, wherein the one or more narrowband subcarriers includes a primary narrowband carrier, and the circuitry is configured with the transmitter to transmit an indication of the primary narrowband carrier, the narrowband communications devices being configured to transmit signals to or receive signals from the primary narrowband carrier before a high priority narrowband carrier or another narrowband carrier.

10. A method of transmitting data to or receiving data from one or more communications devices in a wireless communications network, the infrastructure equipment comprising:
transmitting signals to the one or more communications devices via a wireless access interface;
receiving signals from the one or more of the communications devices via the wireless access interface, the wireless access interface providing communications resources arranged in time divided units of a system bandwidth providing a plurality of blocks of the communications resources, and including one or more narrowband carriers, each carrier providing within a carrier frequency bandwidth of the communications resources for transmitting signal to narrowband communications devices on a downlink or receiving signals from the narrowband communications devices on an uplink, the carrier frequency bandwidth being less than and within the system bandwidth, and signals transmitted to the narrowband communications devices or received from the one or more of narrowband communications devices via the one or more of narrowband carriers are transmitted with a first configuration,
receiving a control message representing a request to transmit a high priority message from at least one of the narrowband communications devices; and
transmitting signals on a downlink of a narrowband carrier to the at least one of the narrowband communications devices with a second configuration, wherein the first configuration includes transmitting the signals with a first power, and transmitting the signals with the second configuration includes increasing the power of the signals above the first power to a second power to reduce a time for communicating a high priority message transmitted to the at least one narrowband communications device devices devices.

11. A communications device for transmitting data to or receiving data from an infrastructure equipment of a wireless communications network, the communications device comprising:
a transmitter configured to transmit signals to the infrastructure equipment via a wireless access interface;
a receiver configured to receive signals from the infrastructure equipment via the wireless access interface, the wireless access interface providing communications resources arranged in time divided units of a system bandwidth providing a plurality of frequency resources; and
circuitry configured to control the transmitter and the receiver to
transmit the signals to or receive the signals from one or more narrowband carriers, each carrier providing within a carrier frequency bandwidth of the communications resources for allocation to narrowband communications devices, the carrier frequency bandwidth being less than and within the system bandwidth, the signals received from the infrastructure equipment via the one or more narrowband carriers having been transmitted with a first configuration;
transmit a request to transmit a high priority message to the infrastructure equipment; and
receive, in response to the infrastructure equipment receiving the request, signals on a downlink of a narrowband carrier which have been transmitted from the infrastructure equipment with an increased power with a second configuration which is different to the first configuration with the effect of reducing a time for communicating the high priority message transmitted to the narrowband communications devices.

12. The communications device of claim 11, wherein the circuitry in combination with the receiver is configured to receive an indication and a location of a high priority narrowband carrier, the high priority narrowband carrier being formed for the downlink and the uplink of the wireless access interface from one of the one or more narrowband carriers, wherein the high priority narrowband subcarrier is the narrowband subcarrier in which the signals are received on the downlink with the second power.

13. The communications device of claim 12, wherein
the circuitry in combination with the receiver is configured to search for a synchronisation signal which is transmitted by the infrastructure equipment for each of the narrowband carriers, wherein the high priority narrowband carrier has a different synchronisation signal to the one or more other narrowband carriers.

14. The communications device of claim 11, wherein
the circuitry in combination with the transmitter and the receiver is configured to receive an indication of the one or more narrowband carriers is a primary narrowband carrier; and
transmit the signals to or receive the signals from the primary narrowband carrier before the high priority narrowband carrier or another narrowband carrier.

15. The communications device of claim 11, wherein
the circuitry is configured with the receiver to receive on the downlink of the high priority narrowband carrier a shortened synchronisation signal compared with a synchronization signal transmitted on one or more other narrowband carriers.

16. The communications device of claim 11, wherein the control message is a random access message which includes a predetermined number which indicates a request to transmit the high priority message.

17. The communications device as claimed in claim 11, wherein
a downlink of the one or more narrowband carriers is paired with an up-link of the narrowband carriers, and the circuitry is configured with the transmitter and the receiver to transmit the request to transmit the high priority message on the uplink which is paired with the downlink narrowband carrier on which the signals are received which have been transmitted by the infrastructure equipment with the second power.

18. The communications device of claim 11, wherein the circuitry and the transmitter are configured to receive on the downlink of the high priority narrowband carrier a shortened system information signal compared with a system information signal received on one or more other narrowband carriers, the system information providing an indication of one or more parameters of the narrowband carrier.

\* \* \* \* \*